Jan. 5, 1937.  F. MESURAC  2,066,793
FILTER
Filed Dec. 5, 1935

INVENTOR.
Frank Mesurac
BY
ATTORNEY.

Patented Jan. 5, 1937

2,066,793

UNITED STATES PATENT OFFICE 2,066,793

FILTER

Frank Mesurac, Woodhaven, N. Y.

Application December 5, 1935, Serial No. 52,939

2 Claims. (Cl. 210—169)

This invention is directed more especially to a water filter construction for use in the hot wells of marine boiler room installations, although the filtering element forming part of this invention may be used as a filter in any other connection.

The hot wells of marine boiler installations are connected to receive water from the condensers, so that the steam coming from the boilers is condensed and then passed through the hot well to be returned to the boiler as boiler feed water. It is found in practice that this feed water is apt to contain grease, boiler cake, lint, rust, as well as other impurities which should be removed before the water is fed back into the boilers.

It has heretofore been the practice to use sponges as a filtering medium in this connection, the sponges being discarded when dirty and new sponges introduced into their place.

The object of the present invention is primarily to provide an indestructible construction for use as specified and one which will properly filter impurities from the water and, when dirty, may be easily cleansed for re-use.

When the present invention is utilized in connection with hot wells, it consists in a plurality of spaced apart metal plates, each of which is perforated throughout by openings punched in a direction contra to the flow and in such manner as to provide protuberances which extend in such counter direction. The plates are preferably arranged in series of successively smaller openings in the direction of the flow, so as to successively filter out impurities of progressively smaller sizes, as well as to permit of removal of oil and grease.

The filter plates individually constitute an important part of this invention because these plates embody numerous features of novelty, adapting them to efficiently carry out the filtering function. One very important feature resides in the fact that the perforations are formed in such manner that each perforation or opening is in the apex of a protuberance. In other words, the material of the plate is pressed up to form a protuberance and the apex of the protuberance is broken out to leave points and edges which are spaced from the plane of the plate, so as to leave between adjacent protuberances and perforations valleys for the accumulation of grease and other impurities. In other words, the actual openings in the plate are formed in protuberances above the plane of the plate and do not extend to the base of the valleys, so that there is left between these protuberances valleys or channels for the accumulation of impurities.

When a plurality of these plates are positioned in spaced apart relation, so as to successively intercept the flow of water, each plate will remove a part of the impurities, so that the filter will deliver substantially clear water. This is particularly so if the plates are so positioned that the water successively passes through plates of progressively smaller openings and this is the preferred form of the invention.

Features of the invention, other than those adverted to, will be apparent from the hereinafter detailed description and claims, when read in conjunction with the accompanying drawing.

The accompanying drawing illustrates one practical embodiment of the invention, but the construction therein shown is to be understood as illustrative, only, and not as defining the limits of the invention.

Figure 2:
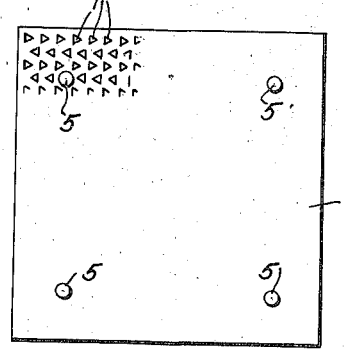
Figure 2 is a plan view of one of the plates removed.
Figure 1:
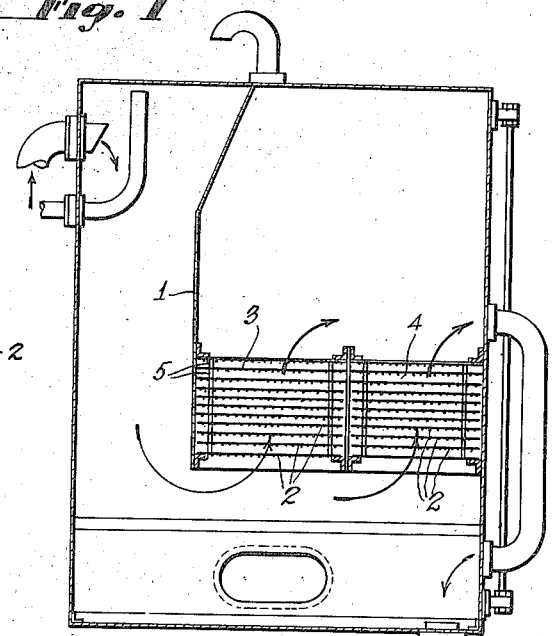
Figure 1 is a central section through a hot well showing therein a plurality of filter plates embodying the present invention in elevation.

In Figure 1, I have shown in a more or less conventional manner a filter casing 1 which may in practice be of any appropriate shape and size. Through this casing liquid is adapted to flow in the direction indicated by the arrows and within the casing and forming a substantially close fit with the side walls thereof are a plurality of superimposed spaced apart filter plates 2. I have shown two groups 3 and 4 of these plates positioned side by side in the filter casing 1 of a hot well through which the flow of liquid is such that the liquid passes through the plates of both groups. Any number of groups of plates may be employed in the relation shown and any number of plates may be incorporated in each group depending on conditions. The plates of each group are preferably provided with perforations which are progressively smaller in the direction of the liquid flow, so as to progressively filter out coarse and finer extraneous material from the water passing therethrough. If desired each group may embody a succession of plates of graduated openings with superimposed groups of further graduated openings of appropriate sizes to fulfill requirements of particular conditions. In any event, the plates are spaced apart by legs or spacers 5 of any appropriate kind.

Figure 3:
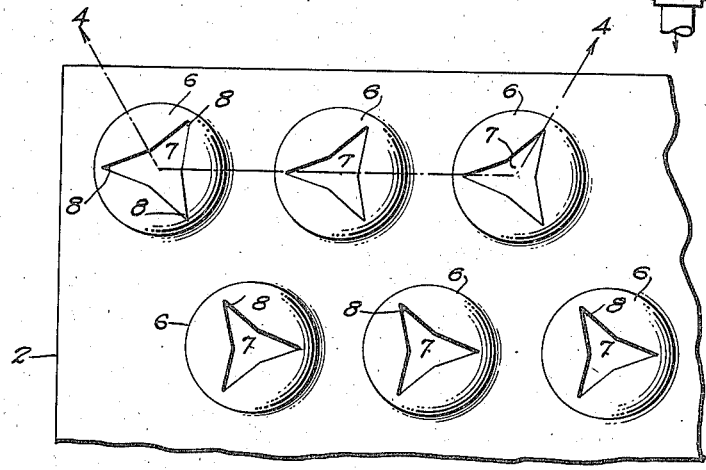
Figure 3 is a greatly enlarged fragmental plan view of the structure shown in Figure 2.
Figure 4:
Figure 4 is a section on the broken line 4—4 of Figure 3.

Aside from the size of the openings in the respective plates, they are all of the same construction. They are preferably made from sheet metal of a character to resist corrosion or damage by the liquid to be filtered, although they may be made from corrosive metal and plated or galvanized with a corrosive resistant material. Each plate is formed with fairly closely spaced apart openings formed in a novel and unusual manner. In the ordinary processes of perforating sheet metal, it is the practice to place the sheet stock beneath a die and punch a clean hole through the metal leaving at the upper and lower edges of the metal substantially flush planes with which the punched holes intersect. In carrying out the present invention, however, a different practice is followed. The tool or other die which makes the hole is caused first to press up the metal, in the zone of the hole to be formed, into a protuberance and, after the protuberance has been produced, then the metal is fractured and broken open at the apex of the protuberance. This produces a construction, such as shown in Figures 3 and 4, wherein a number of these holes are shown on a greatly enlarged scale. The tool used to make the openings shown is of triangular form. As it is pressed against the bottom of the plate 2, it forms the protuberance 6 before the metal gives way to let the tool through and consequently there is a well defined protuberance in the apex of which the hole 7 is formed with a serrated or saw-toothed edge, which is fairly sharp and of a character to catch lint and other stringy materials, such as particles which might break away from valve packings, gaskets and the like. It is to be noted, moreover, that the openings 7 have relatively acute angular corners 8 which are spaced appreciably above the plane of the upper surface of the plate as shown in Figure 4. Here, for concrete illustration, P designates the upper plane of the plate 2, whereas P' designates the plane in which substantially all of the angles 8 are located. There will of course be some little variation in these various corner angles 8, but they will invariably be spaced above the plane P, so as to leave between adjacent openings 7 relatively deep valleys indicated in Figure 4 by the reference character 9, and in these valleys, sludge, oil, rust and other impurities are free to lodge and collect without clogging the filter.

The plates are made of a contour and size to fit closely within the walls of the casing 1, so that water cannot freely circulate around their edges, but must necessarily pass through the perforations. Consequently, the impurities which collect in the valleys will remain there until the amount becomes excessive when the filter should be cleaned. This may be accomplished by removing the plates and subjecting them to the scouring and cleaning action of live steam. The cleaning operation may be expeditiously carried on and the plates immediately replaced for further use. They are practically indestructible and may be used throughout long periods.

I have described the plates as made from sheet metal and punched. I find this method of making them results in a filter plate of high efficiency. It is possible, however, that similar results might be obtained by casting the plates with projections or protuberances with perforations in the apices thereof. The serrated edges of the openings 7 seem to work best when they are rough or jagged for then they tend to more efficiently catch and hold extraneous matter coming in contact therewith.

It will of course be understood that the plates of this invention may be made of any size and shape, that they may be spaced apart as desired and used in any numbers depending upon the particular work which they are desired to perform. They should, however, be so placed in each instance that the apertured protuberances should extend in the direction contra to the flow of liquid to be passed therethrough, so as to obtain the maximum filtering effect. When thus employed, experience has shown that they will filter efficiently and deliver water free from objectionable impurities. Furthermore the filter of this invention is non-clogging in its operation and it will in practice collect and retain a very considerable amount of impurities without passing them or clogging. The valleyed arrangement effectually produces this result and provides adequate space for impurities in positions wherein they will not cause clogging of the filter.

In the accompanying drawing, the plates are shown as flat, yet they may be made curvilinear or otherwise without departing from this invention.

The foregoing detailed description sets forth the invention in its preferred practical forms, but the invention is to be understood as fully commensurate with the appended claims.

Having thus fully described the invention, what I desire to claim and secure by Letters Patent is:

1. In an assembly of the character described, a filter housing, a liquid inlet and outlet thereof, a plurality of spaced apart filter plates within the housing to intercept the flow of liquid therethrough, each of which is provided with adjacent closely spaced apart protuberances projecting in the direction contra to the flow of liquid through the housing, the apex of each protuberance being provided with an opening having a jagged, sharp and uneven edge adapted to catch lint and other stringy materials and all parts of which edge are spaced from the corresponding face of the plate to provide between said openings valleys for the accumulation of extraneous material.

2. In an assembly of the character described, a filter housing, a liquid inlet and outlet therefor, a plurality of spaced groups of filter plates within the housing and between the inlet and outlet thereof, each group comprising a plurality of spaced apart plates, each of which is provided with adjacent closely spaced apart protuberances projecting in the direction contra to the flow of liquid through the housing, the apex of each protuberance being provided with an opening having a jagged, sharp and uneven edge adapted to catch lint and other stringy materials and all parts of which edge are spaced from the corresponding face of the plate to provide between said openings valleys for the accumulation of extraneous material.

FRANK MESURAC.